US012787918B2

(12) United States Patent
Vaughn

(10) Patent No.: US 12,787,918 B2
(45) Date of Patent: Nov. 10, 2026

(54) MOWER BLADE WITH HEXAGONAL APERTURE

(71) Applicant: Michael Vaughn, Philadelphia, MS (US)

(72) Inventor: Michael Vaughn, Philadelphia, MS (US)

( * ) Notice: Subject to any disclaimer, the term of this patent is extended or adjusted under 35 U.S.C. 154(b) by 846 days.

(21) Appl. No.: 17/886,826

(22) Filed: Aug. 12, 2022

(65) Prior Publication Data

US 2024/0049630 A1 Feb. 15, 2024

(51) Int. Cl.
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC ... A01D 34/733; A01D 2101/00; A01D 34/63
USPC ....................................... 56/DIG. 20; 30/276
See application file for complete search history.

(56) References Cited

U.S. PATENT DOCUMENTS 2,509,343 A * 5/1950 Henderson ............. A01D 34/52 172/549
2,697,323 A * 12/1954 Horn .................... A01D 34/736 83/698.41
2,871,957 A * 2/1959 Zacharias, Jr. ........ A01D 43/12 172/111
3,465,508 A * 9/1969 Edwards ................ A01D 34/73 56/295
3,762,138 A * 10/1973 Michael ............... A01D 34/733 56/295
3,788,050 A * 1/1974 Houst .................... A01D 34/73 30/DIG. 6
4,062,171 A * 12/1977 Rose .................... A01D 34/736 56/295
4,229,933 A * 10/1980 Bernard ............... A01D 34/733 56/295
4,413,468 A * 11/1983 Hockersmith ....... A01D 34/733 56/295

(Continued)

FOREIGN PATENT DOCUMENTS

CN 300884609 2/2009
CN 207948149 U * 10/2018

(Continued)

OTHER PUBLICATIONS

Craftsman 2-pack 36-in deck multipurpose mower blade for riding mower/tractors; URL:https://www.lowes.com/pd/CRAFTSMAN-2-Pack-36-in-Multipurpose-Riding-Mower-Tractors-Mower-Blades/1002102960; Author(s): N/A; Accessed: May 18, 2022.

(Continued)

*Primary Examiner* — Christopher J Sebesta
*Assistant Examiner* — Sunny D Webb
(74) *Attorney, Agent, or Firm* — Bradley Arant Boult Cummings LLP

(57) ABSTRACT

Mower blades are provided having a hexagonal central aperture configured such that a variety of retaining plates can pass through the aperture. This allows the mower blade to function with replaceable-blade mower systems having any of a variety of retaining-plate shapes, including both symmetric and asymmetric retaining-plate shapes, including S-shaped retaining plates.

17 Claims, 11 Drawing Sheets

(56) References Cited

U.S. PATENT DOCUMENTS

| | | | | |
|---|---|---|---|---|
| 4,578,938 | A * | 4/1986 | Genesco | A01D 42/02 56/16.9 |
| 4,637,391 | A * | 1/1987 | Schlein | A61F 15/02 606/178 |
| D289,524 | S | 4/1987 | Andersson et al. | |
| 4,922,698 | A * | 5/1990 | Taylor | A01D 34/733 56/295 |
| 4,959,904 | A * | 10/1990 | Proulx | A01D 34/4163 30/276 |
| 5,019,113 | A * | 5/1991 | Burnell | A01D 34/733 56/DIG. 17 |
| 5,094,065 | A * | 3/1992 | Azbell | A01D 34/73 56/255 |
| 5,303,688 | A * | 4/1994 | Chiuminatta | B27B 5/32 83/676 |
| D357,691 | S | 4/1995 | Bryant | |
| 5,454,216 | A * | 10/1995 | Myszka | A01D 34/733 56/255 |
| 5,724,796 | A * | 3/1998 | Plamper | A01D 34/733 56/DIG. 17 |
| 5,881,540 | A * | 3/1999 | Miller | A01D 34/733 56/255 |
| D440,580 | S | 4/2001 | Cooper et al. | |
| 6,340,022 | B1 * | 1/2002 | Schroer | B27B 5/32 451/342 |
| 6,490,850 | B1 * | 12/2002 | Seegert | A01D 34/005 56/DIG. 17 |
| D482,700 | S | 11/2003 | Lancaster | |
| 6,925,789 | B2 * | 8/2005 | Lin | A01D 34/416 56/12.7 |
| 7,127,877 | B2 * | 10/2006 | Curran | A01D 34/73 D15/17 |
| 7,484,736 | B2 * | 2/2009 | Allemann | B24D 5/16 279/93 |
| D598,475 | S | 8/2009 | Roth | |
| D649,981 | S | 12/2011 | Roth et al. | |
| 8,136,435 | B2 * | 3/2012 | Zhu | B26D 1/0006 83/478 |
| D693,373 | S | 11/2013 | Shiotsuki et al. | |
| D696,301 | S | 12/2013 | Deleon et al. | |
| D710,396 | S | 8/2014 | Nie | |
| 8,869,369 | B1 * | 10/2014 | Roach | A01D 34/733 83/698.41 |
| 9,420,742 | B2 * | 8/2016 | Martinez | A01D 34/733 |
| D781,927 | S | 3/2017 | Craven et al. | |
| 10,117,380 | B1 * | 11/2018 | Kaukler | A01D 34/73 |
| 10,123,479 | B2 * | 11/2018 | Ladd, Jr. | A01D 34/835 |
| 10,257,976 | B2 | 4/2019 | Ladd et al. | |
| 10,299,431 | B2 | 5/2019 | Ladd et al. | |
| 10,362,730 | B2 | 7/2019 | Ladd et al. | |
| 10,517,212 | B2 * | 12/2019 | Haun | A01D 34/733 |
| D873,302 | S | 1/2020 | Southwell | |
| D880,967 | S | 4/2020 | Guth | |
| 10,674,659 | B2 | 6/2020 | Ladd et al. | |
| D902,262 | S | 11/2020 | Hoover | |
| 10,874,049 | B2 | 12/2020 | Ladd et al. | |
| D911,395 | S | 2/2021 | Dimitrakopoulos et al. | |
| 2020/0253116 | A1 | 8/2020 | Ladd et al. | |

FOREIGN PATENT DOCUMENTS

| | | | | |
|---|---|---|---|---|
| CN | 209330610 | U * | 9/2019 | |
| CN | 305650338 | | 3/2020 | |
| CN | 307316569 | | 5/2020 | |
| DE | 2737176 | A * | 3/1979 | A01D 34/736 |
| EM | 0024076190001 | | 2/2014 | |
| KR | 20110001529 | U * | 2/2011 | A01D 34/73 |
| KR | 300845919.0000 | | 3/2016 | |
| KR | 300915504.0000 | | 7/2017 | |
| KR | 301001980.0000 | | 4/2019 | |
| KR | 301083930.0000 | | 11/2020 | |
| KR | 301099877.0000 | | 3/2021 | |
| WO | WO-2016037184 | A1 * | 3/2016 | A01D 34/733 |
| WO | WO-2018057552 | A1 * | 3/2018 | A01D 34/73 |

OTHER PUBLICATIONS

Mulching Blade; URL: https://www.dewalt.com/product/dwo1dt233/21-mulching-blade; Author(s): N/A; Accessed: May 18, 2022.

36-inch Deck Multipurpose Mower Blade for Riding Mower/Tractors available from CRAFTSMAN in item No. CMXGZAM110190 or as part No. 742P05535. See, e.g., Craftsman, https://www.craftsman.com/product/cmxgzam110190/36-mulching-bagging-and-side-discharging-blade-set [accessed Nov. 14, 2022].

* cited by examiner

MOWER BLADE WITH HEXAGONAL APERTURE

FIELD OF INVENTION

This disclosure relates generally to mowers (including lawn-mowers and mowers specially adapted for particular purposes) characterized by having rotating cutters rotating about a vertical axis. More particularly, this disclosure relates both to such mowers mounted on a vehicle and to cutting-blade mounting means for cutting apparatuses of such mowers.

BACKGROUND

A need exists for mower-blade assemblies having a replaceable cutting blade. And U.S. patent application Ser. No. 14/847,909 (the "'909 Application")—titled "QUICK CHANGE LAWN MOWER BLADES" and filed on Sep. 8, 2015, and the entire disclosures of which are hereby incorporated by reference—discloses such a mower-blade assembly and mower blades to be used therewith.

But the mower blades that are disclosed by the '909 Application are not optimal. Specifically, the mower blades disclosed by the '909 Application have a retaining plate aperture (an "RPA") that is asymmetric about a central axis. One disadvantage of such an RPA is that the RPA will only fit retaining plates that have a matching, asymmetric shape. Another disadvantage of such an RPA is that it sustains additional wear-and-tear due to its a symmetricity and concentrated-stress points. A third disadvantage of such an RPA is that is must be installed in a particular orientation which is difficult to ascertain except through trial-and-error. So, a need exists for mower blades that will fit a greater variety of retaining plates and that will sustain less wear-and-tear.

The present disclosure describes a mower blade having an RPA that: (1) is symmetric; (2) is adapted fit not only the retaining plate disclosed by the '909 Application but also other-shaped retaining plates; (3) sustains less wear-and-tear than does the mower blade disclosed by the '909 Application; and (4) can be installed in either of two orientations according to the need of the user.

SUMMARY OF THE INVENTION

A mower blade is disclosed, which, in a first embodiment, comprises: an elongate blade having opposed end edges and opposed side edges: wherein the elongate blade is adapted for mounting onto a rotary mower for rotation about a center axis extended transverse to the elongate blade and separating the elongate blade into opposed elongate end portions extended from the center axis; wherein the elongate blade has a blade major axis and a blade minor axis; wherein the elongate blade defines a first pin aperture positioned a distance from the center axis; wherein the elongate blade defines a force finger aperture positioned a distance from the center axis and a distance away from the first pin aperture; and wherein the elongate blade further defines a retaining plate aperture that is centrally located and is symmetric both about the blade major axis and about the blade minor axis and is of a convex shape, wherein the retaining plate aperture is hexagon-shaped.

A mower blade is disclosed, which, in a second embodiment, comprises: opposed end edges and opposed side edges; wherein the blade is adapted for mounting onto a mower for rotation about a center axis extended transverse to the blade; wherein the blade has a blade major axis and a blade minor axis; wherein the blade defines a pin aperture positioned a distance from the center axis and a distance from the blade major axis, wherein the pin aperture is located on a pin line that is not parallel to the blade major axis and the pin line passes through the center axis; wherein the blade defines a force finger aperture positioned a distance from the center axis and a distance away from the pin aperture; wherein the force finger aperture is located on a finger line that is not parallel to the blade major axis and the finger line passes through the center axis and is radially offset from the pin line; and wherein the blade defines a central aperture located on the center axis, wherein the central aperture is centrally located and is symmetric both about the blade axis and about the blade minor axis.

A mower blade is disclosed, which, in a third embodiment, comprises: a blade having a blade major axis, a blade minor axis, and a center axis parallel both to the blade major axis and to the blade minor axis; wherein the blade defines a first aperture that is symmetric both about the blade axis and about the blade minor axis and that is centrally located, wherein the first aperture is a convex hexagon having a first side, a second side, a third side, a fourth side, a fifth side, and a sixth side, wherein: the first side and the fourth side are parallel to each other and are each of a first side-length, the second side and the fifth side are parallel to each other and are each of a second side-length, and the third side and the sixth side are parallel to each other and are each of a second side-length; and wherein the first aperture has a length and a width.

BRIEF DESCRIPTION OF THE DRAWINGS

The following drawings are attached to—and form a portion of—this disclosure.

DEFINITIONS

Figure 1:
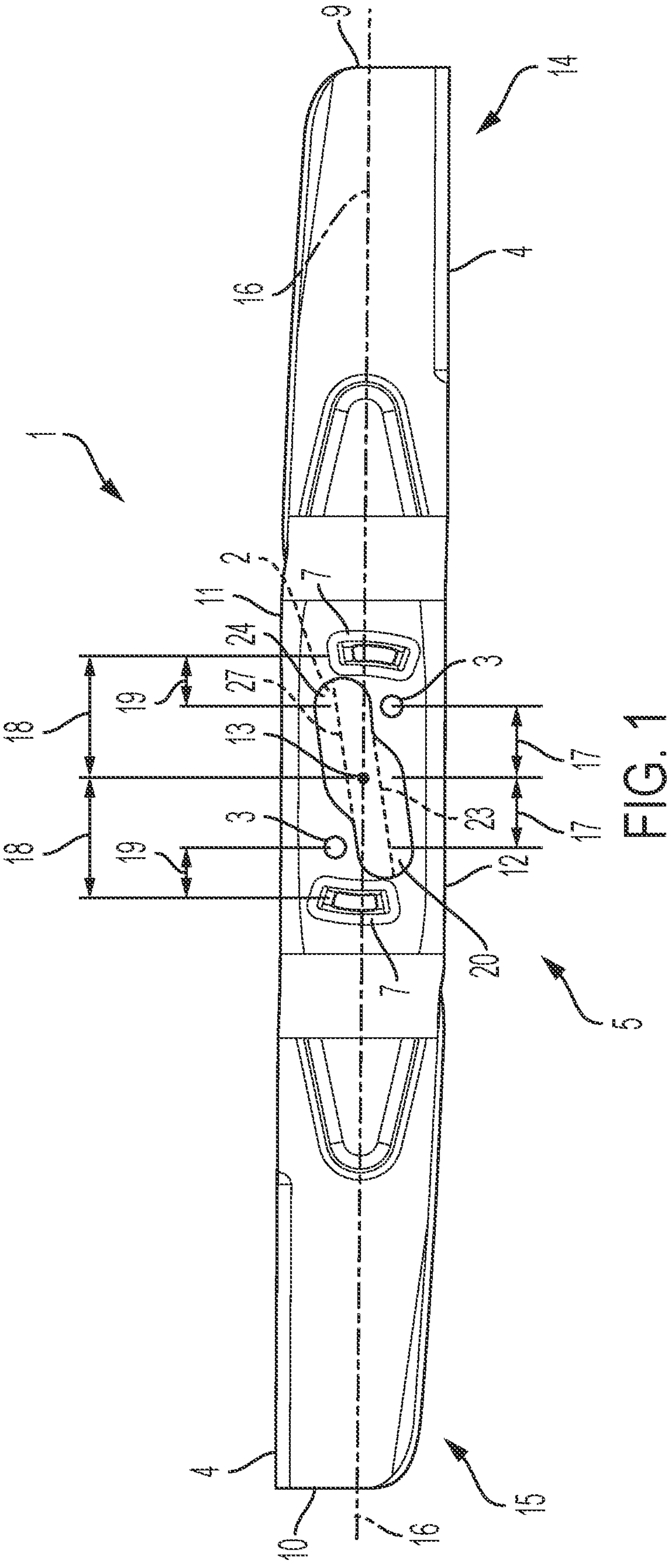
FIG. 1 is a top view of the cutting blade disclosed by Ladd.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "connected to," "in connection with," "in communication with," or "connecting" include any suitable connection or communication, including any mechanical connection, welded joint, hinge, or fastener.

The term "Ladd" means the disclosures (as of the date of filing of this disclosure with the United States Patent and Trademark Office) in the following patent applications—including all parents, continuations, continuations-in-part, divisions, publications, and issued patents—:

(1) U.S. Application Ser. No. 62/046,303 (titled "QUICK CHANGE LAWN MOWER BLADE" and filed Sep. 5, 2014);
(2) U.S. Application Ser. No. 62/171,518 (titled "QUICK CHANGE LAWN MOWER BLADES" and filed Jun. 5, 2015);
(3) U.S. application Ser. No. 14/847,909 (titled "QUICK CHANGE LAWN MOWER BLADES" and filed Sep. 8, 2015);
(4) U.S. Pat. No. 10,123,479 (titled "QUICK CHANGE LAWN MOWER BLADES" and issued Nov. 13, 2018);
(5) U.S. Pat. No. 10,257,976 (titled "QUICK CHANGE LAWN MOWER BLADES" and issued Apr. 16, 2019);
(6) U.S. Pat. No. 10,299,431 (titled "QUICK CHANGE LAWN MOWER BLADES" and issued May 28, 2019);
(7) U.S. patent application Ser. No. 16/862,903 (titled "QUICK CHANGE LAWN MOWER BLADES" and filed Apr. 30, 2020);
(8) U.S. Pat. No. 10,674,659 (titled "QUICK CHANGE LAWN MOWER BLADES" and issued Jun. 9, 2020); and
(9) U.S. Pat. No. 10,874,049 (titled "QUICK CHANGE LAWN MOWER BLADES" and issued Dec. 29, 2020);

each of which are hereby incorporated in their entirety.

The "CRAFTSMAN Product" means the 36-inch Deck Multipurpose Mower Blade for Riding Mower/Tractors available from CRAFTSMAN in item number CMXGZAM110190 or as part number 742P05535. See, e.g., Craftsman, <https://www.craftsman.com/product/cmxg-zam110190/36-mulching-bagging-and-side-discharging-blade-set>[accessed Aug. 2, 2022].

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Mower blades with a hexagonal aperture have been developed and are described.

FIG. 1 is a top view of the cutting blade 1 disclosed by Ladd. Further disclosures related to this cutting blade 1 are available in the disclosures of Ladd, which are hereby incorporated in their entirety herein. The cutting blade 1 is selectively attachable to a mounting plate (not shown in FIG. 1). The cutting blade 1 can be selectively mounted and retained between the mounting plate (not shown in FIG. 1) and a retaining plate (not shown in FIG. 1).

The cutting blade 1 defines a retaining plate aperture 2. The cutting blade 1 defines at least one first pin aperture 3.

The cutting blade 1 can be configured with a sharpened cutting edge 4. In one example, the cutting edge 4 can be two inches to six inches in length. The cutting blade 1 can incorporate an offset so that the cutting edge 4 is closer to the grass (ground plane) than a center section 5. The side of the cutting blade 1 opposite the cutting edge 4 may incorporate the ramped surface (not specifically shown in FIG. 1) as a sail that produces higher pressure above (and lower pressure below) the rotating cutting blade 1.

The cutting blade 1 defines at least one force finger aperture 7. The at least one force finger aperture 7 can be located generally along a centerline of the cutting blade 1. The at least one force finger aperture 7 can be located in a localized indentation (not specifically shown in FIG. 1) on the cutting blade 1.

The cutting blade 1 is an elongated blade having opposed end edges 9, 10 and opposed side edges 11, 12. The cutting blade 1 is adapted for mounting onto a rotary mower (not shown) for rotation about a central axis 13. The central axis 13 extends transverse to the cutting blade 1 and separates the cutting blade 1 into opposed elongate end portions 14, 15 that are extended from the central axis 13. Additionally, the cutting blade 1 has a blade major axis 16.

The first pin aperture 3 is positioned a distance 17 from the central axis 13. The force finger aperture 7 is positioned: (1) a distance 18 from the central axis 13; and (2) a distance 19 from the first pin aperture 3. In the example of FIG. 1, the cutting blade 1 defines two first pin apertures and two force finger apertures 7.

The retaining plate aperture 2 is centrally located and is asymmetric about the central axis 13. The retaining plate aperture 2 is defined by a first stadium-shaped portion 20. (For convenience—and consistent with Ladd—this disclosure uses the term "stadium-shaped"; however, this shape can also be termed ovoid, obround, or any number of other descriptive terms.) The first stadium-shaped portion 20 has a long dimension (not specifically shown in FIG. 1), a short dimension (not specifically shown in FIG. 1), and a first centerline 23 along its long dimension. The retaining plate aperture 2 is further defined by a second stadium-shaped portion 24. The second stadium-shaped portion 24 has a long dimension (not specifically shown in FIG. 1), a short dimension (not specifically shown in FIG. 1), and a second centerline 27 along its long dimension.

The first and second centerlines 23, 27 are offset from one another along a direction substantially perpendicular to the direction of the first centerline 23 and of the second centerline 27. The first stadium-shaped portion 20 and the second stadium-shaped portion 24 are offset from each other along the blade major axis 16 and a lateral dimension (not specifically shown in FIG. 1) of the cutting blade 1. The second stadium-shaped portion 24 partially intersects or overlaps the first stadium-shaped portion 20 at a generally center portion of the cutting blade 1.

Figure 2:
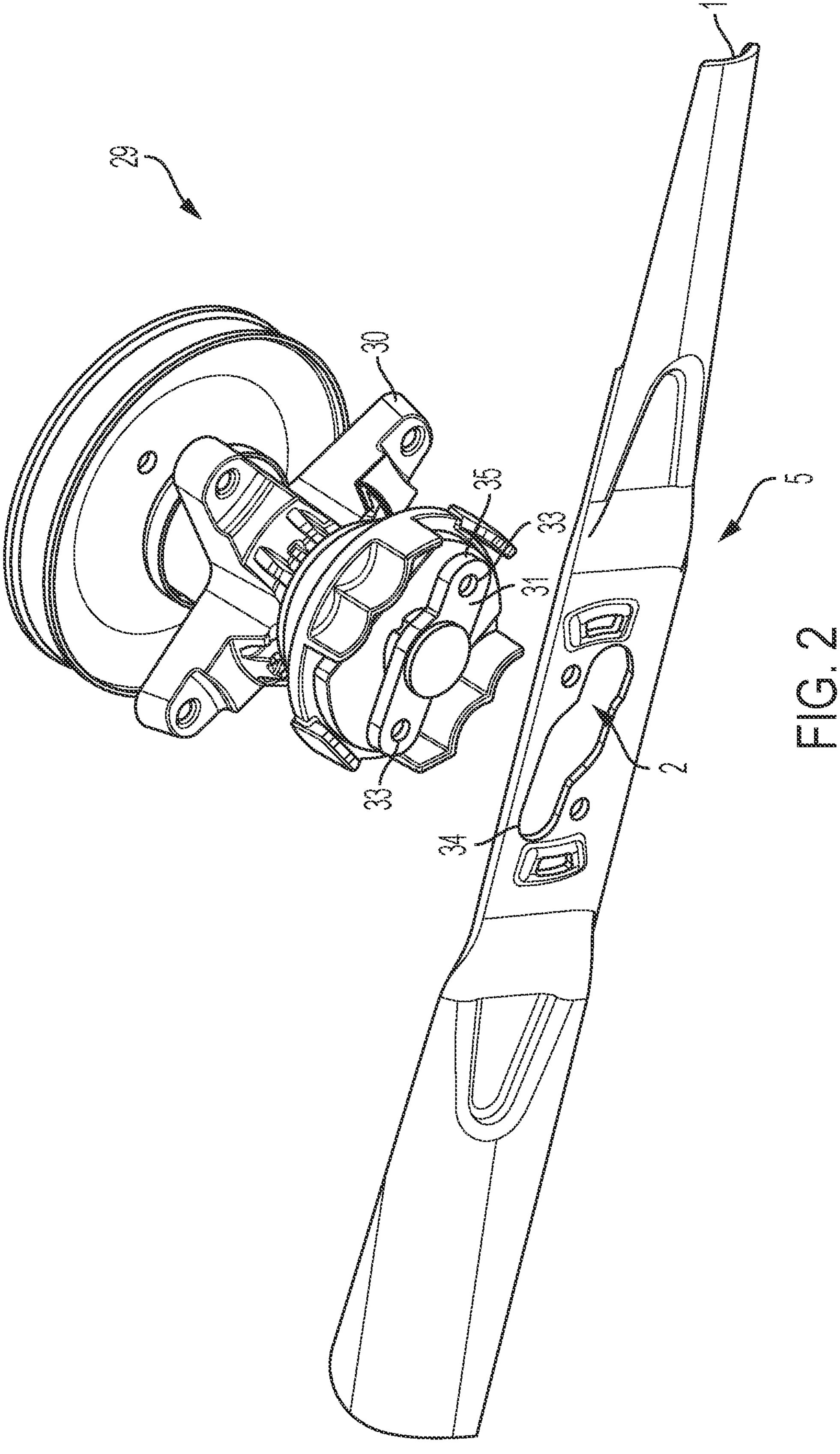
FIG. 2 is a perspective bottom view of the mower-blade assembly disclosed by Ladd, with the cutting blade of FIG. 1 removed from the mower-blade assembly.

FIG. 2 is a perspective bottom view of the mower-blade assembly 29 disclosed by Ladd, with the cutting blade 1 of FIG. 1 removed from the mower-blade assembly 29. Further disclosures related to this mower-blade assembly 29 are available in the disclosures of Ladd, which are hereby incorporated in their entirety herein. The mower-blade assembly 29 provides a removable connection for the cutting blade 1.

The mower-blade assembly 29 includes a mounting plate 30 attached to a rotatable spindle (not shown in FIG. 2).

The mower-blade assembly 29 includes a retaining plate 31 attached to the rotatable spindle (not shown in FIG. 2). The retaining plate 31 defines a central bore (not specifically shown in FIG. 2) which is centered about the axis of the rotatable spindle. The retaining plate 31 defines at least one second pin aperture 33. The location of the second pin aperture 33 is identical to the location of the first pin aperture 3.

As shown in FIG. 2, a perimeter 34 of the retaining plate aperture 2 is slightly larger than a perimeter 35 of the retaining plate 31. The perimeters 34, 35 are configured such that the retaining plate 31 can pass through the retaining plate aperture 2. This relationship allows the cutting blade 1 to pass over the retaining plate 31 such that a portion of the rotatable spindle (not shown in FIG. 2) passes through the cutting blade 1 at the retaining plate aperture 2.

Figure 3A:
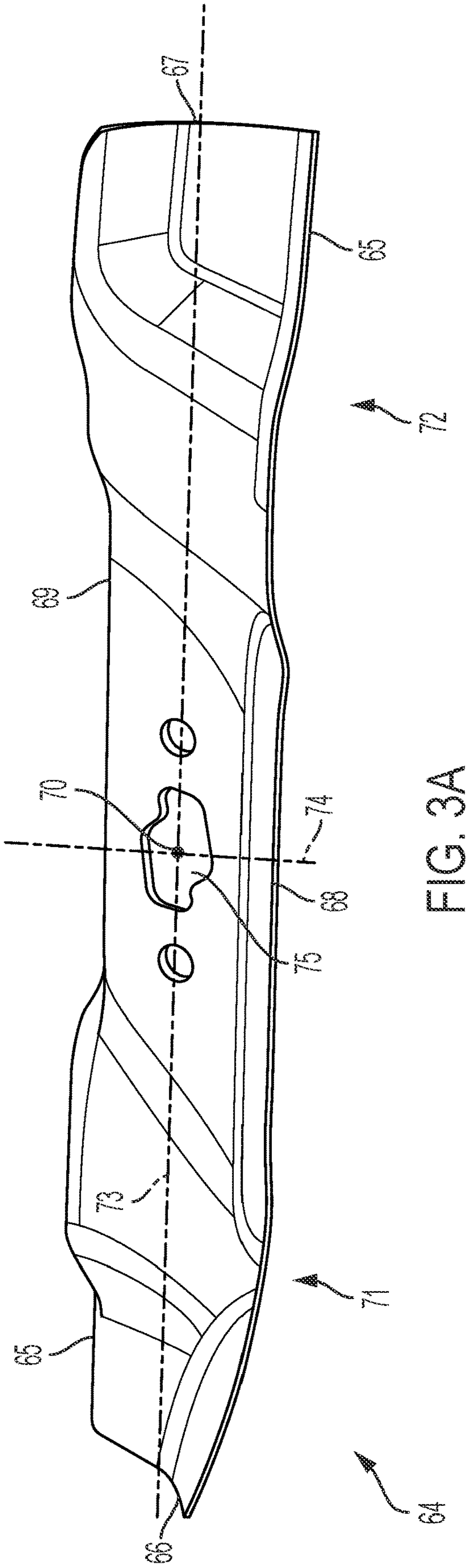
FIG. 3A is a perspective top view of a cutting blade with an S-shaped retaining plate aperture.

FIG. 3A is a perspective top view of a cutting blade 64 with an S-shaped retaining aperture 75. This particular embodiment of a cutting blade 64 with an S-shaped retaining aperture is the CRAFTSMAN Product. The cutting blade 64 is selectively attachable to a mounting plate (not shown in FIG. 3A). The cutting blade 64 can be selectively mounted and retained between the mounting plate (not shown in FIG. 3A) and a retaining plate (not shown in FIG. 3A).

The cutting blade 64 can be configured with a sharpened cutting edge 65. In one example, the cutting edge 65 can be two inches to six inches in length.

The cutting blade 64 is an elongated blade having opposed end edges 66, 67 and opposed side edges 68, 69. The cutting blade 64 is adapted for mounting onto a rotary mower (not shown) for rotation about a central axis 70. The central axis 70 extends transverse to the cutting blade 64 and separates the cutting blade 64 into opposed elongate end portions 71, 72 that are extended from the central axis 70. Additionally, the cutting blade 64 has a blade major axis 73 and a blade minor axis 74.

The cutting blade 64 defines a retaining plate aperture 75. The retaining plate aperture 75 is centrally located. The retaining plate aperture 75 is asymmetric about the blade major axis 73; the retaining plate aperture 75 is asymmetric about the blade minor axis 74.

Figure 3B:
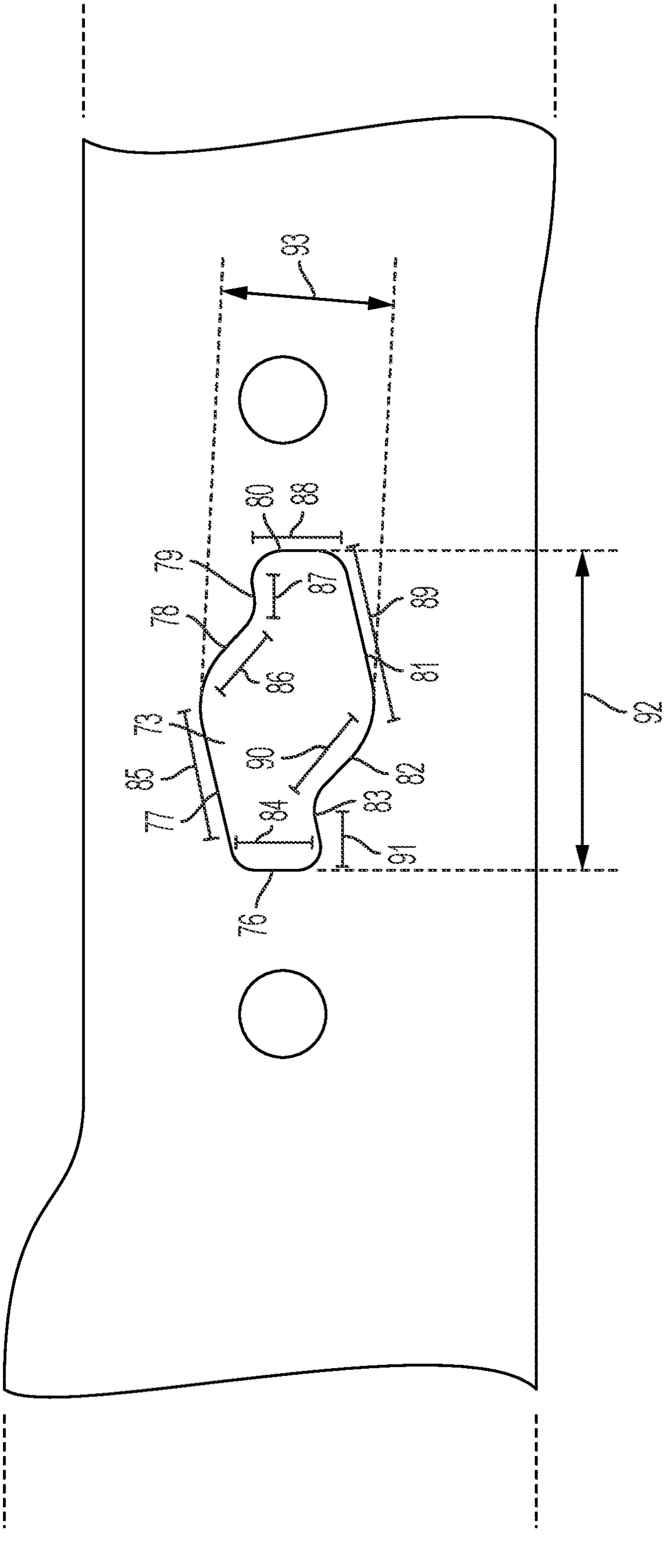
FIG. 3B is a detail view of the S-shaped retaining plate aperture of the cutting blade of FIG. 3A.

FIG. 3B is a detail view of the S-shaped retaining plate aperture 75 of the cutting blade 64 of FIG. 3A. The S-shaped retaining plate aperture 75 is S-shaped and has eight sides 76, 77, 78, 79, 80, 81, 82, 83. The S-shaped retaining plate aperture 75 is shaped as an (elongated) octagonal parallelogon. In some embodiments the shape of the S-shaped retaining plate aperture 75 has rounded vertices. Side 76 and side 80 are opposite each other and parallel both to each other and (approximately) to the blade minor axis 74. Side 77 and side 81 are parallel to each other and make an obtuse angle with side 76 and with side 80 respectively. Side 78 and side 82 are parallel to each other and make an obtuse angle with side 77 and side 81 respectively. Side 79 and side 83 are parallel to each other and make an acute angle with side 80 and side 76 respectively. The angle between side 78 and side 79 is a reflex interior angle; the angle between side 82 and 83 is a reflex interior angle.

The sides 76, 77, 78, 79, 80, 81, 82, 83 each have a length 84, 85, 86, 87, 88, 89, 90, 91 respectively. Length 84 of side 76 is equal to length 88 of side 80; in some embodiments length 84 and length 88 are each 11.0 millimeters. Length 85 of side 77 is equal to length 89 of side 81; in some embodiments, length 85 and length 89 are each 20.4 millimeters. In some embodiments, a length 92 of the S-shaped retaining plate aperture 75 is 39.0 millimeters, and a width 62 of the S-shaped retaining plate aperture 75 is 22.7 millimeters.

The retaining plate aperture 2 is slightly larger than a similarly S-shaped retaining plate (not shown on FIG. 3B). The S-shaped retaining plate can pass through the S-shaped retaining plate aperture 75. This relationship allows the cutting blade 64 to pass over the S-shaped retaining plate such that a portion of the rotatable spindle (not shown in FIG. 3B) passes through the cutting blade 64 at the S-shaped retaining plate aperture 75.

Figure 4:
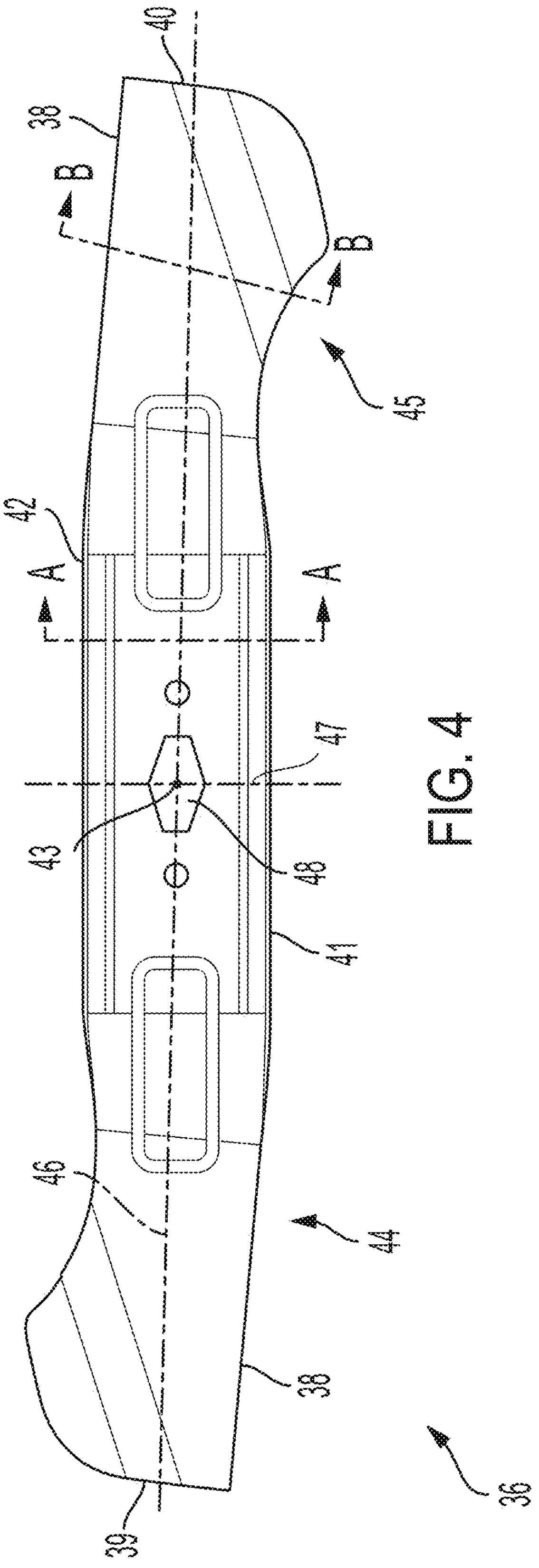
FIG. 4 is a top view of a cutting blade.

FIG. 4 is a top view of a cutting blade 36. The cutting blade 36 is selectively attachable to a mounting plate (not shown in FIG. 4). The cutting blade 36 can be selectively mounted and retained between the mounting plate (not shown in FIG. 4) and a retaining plate (not shown in FIG. 4).

The cutting blade 36 can be configured with a sharpened cutting edge 38. In one example, the cutting edge 38 can be two inches to six inches in length.

The cutting blade 36 is an elongated blade having opposed end edges 39, 40 and opposed side edges 41, 42. The cutting blade 36 is adapted for mounting onto a rotary mower (not shown) for rotation about a central axis 43. The central axis 43 extends transverse to the cutting blade 36 and separates the cutting blade 36 into opposed elongate end portions 44, 45 that are extended from the central axis 43. Additionally, the cutting blade 36 has a blade major axis 46 and a blade minor axis 47.

The cutting blade 36 defines a retaining plate aperture 48. The retaining plate aperture 48 is centrally located. The retaining plate aperture 48 is symmetric about the blade major axis 46; the retaining plate aperture 48 is symmetric about the blade minor axis 47. The retaining plate aperture 48 is of a convex shape.

Figure 5:
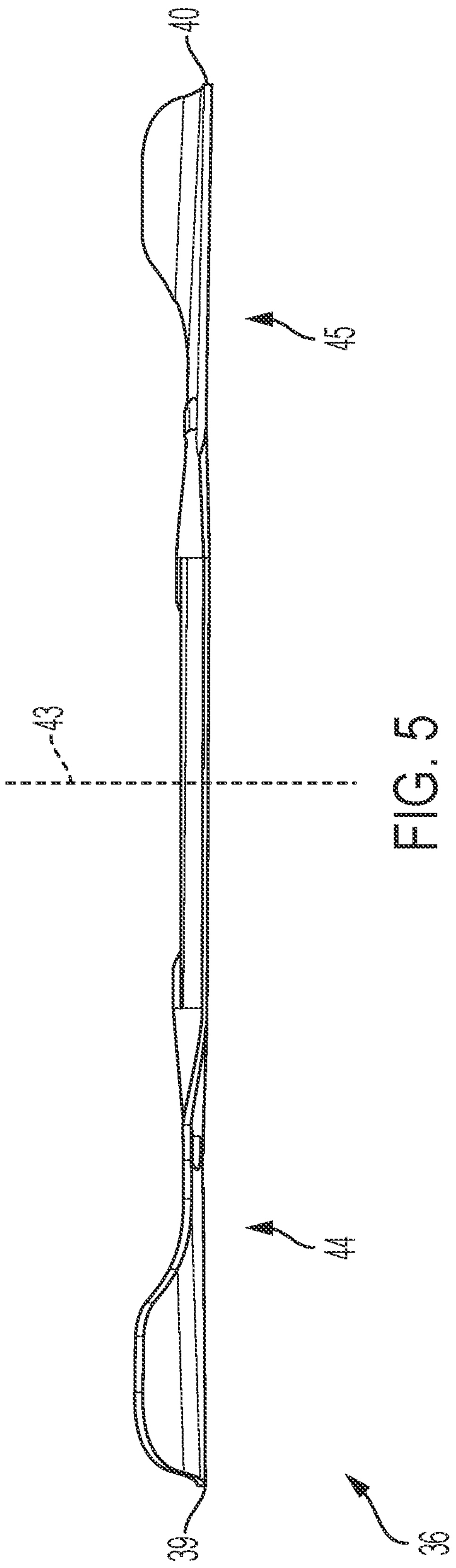
FIG. 5 is a side view of the cutting blade of FIG. 4.

FIG. 5 is a side view of the cutting blade 36 of FIG. 4.

Figure 6:
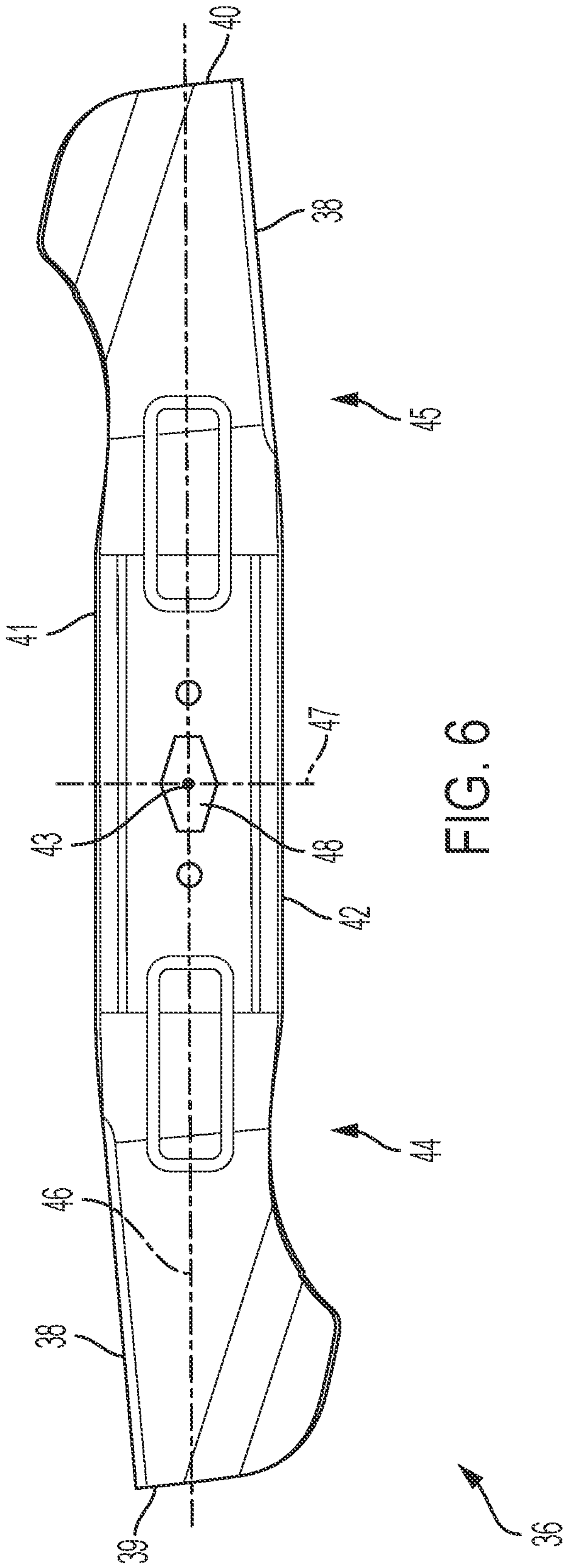
FIG. 6 is a bottom view of the cutting blade of FIG. 4.

FIG. 6 is a bottom view of the cutting blade 36 of FIG. 4.

Figure 7:
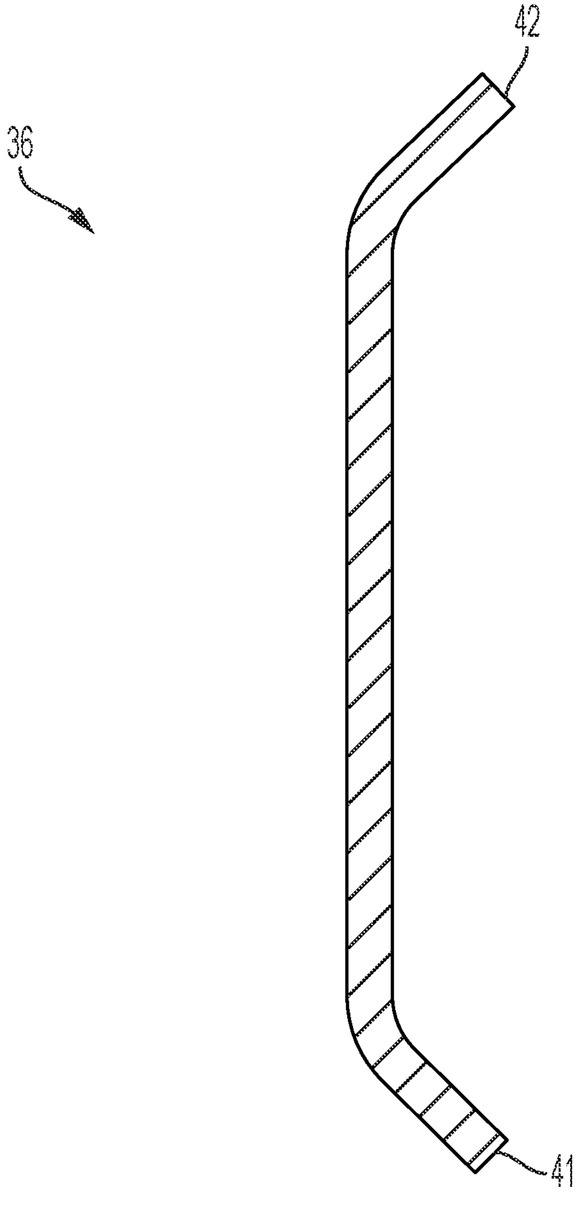
FIG. 7 is a section view along section A-A of the cutting blade of FIG. 4.

FIG. 7 is a section view along section A-A of the cutting blade 36 of FIG. 4.

Figure 8:
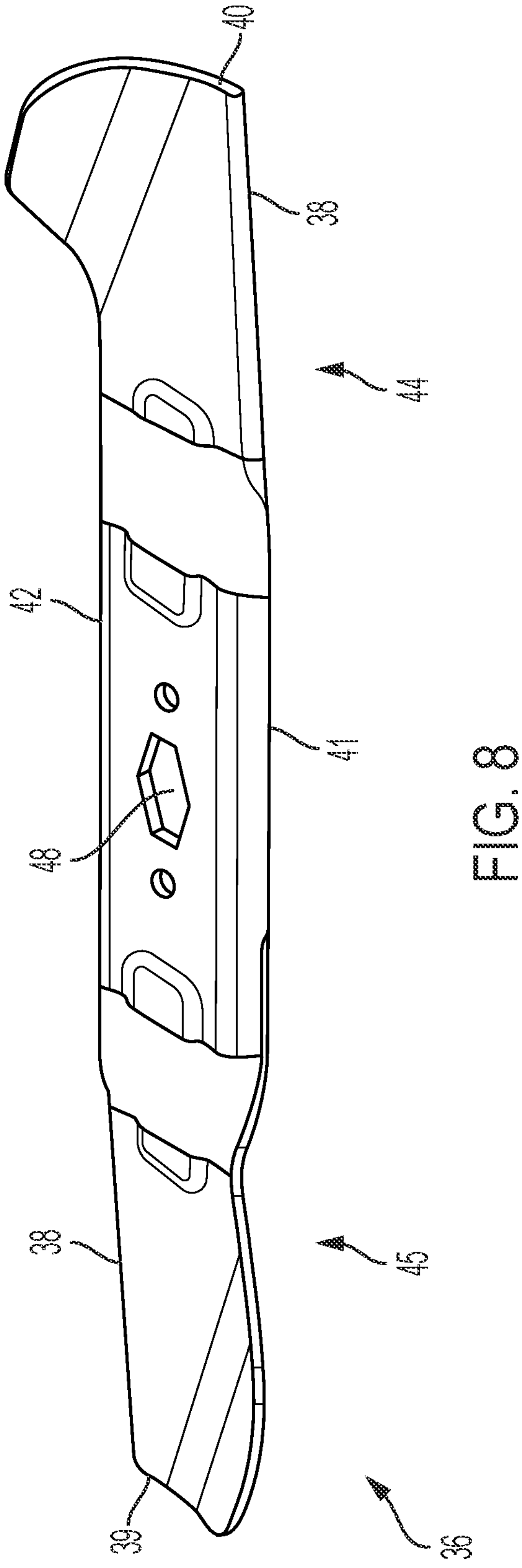
FIG. 8 is a top perspective view of the cutting blade of FIG. 4.

FIG. 8 is a top perspective view of the cutting blade 36 of FIG. 4.

Figure 9:
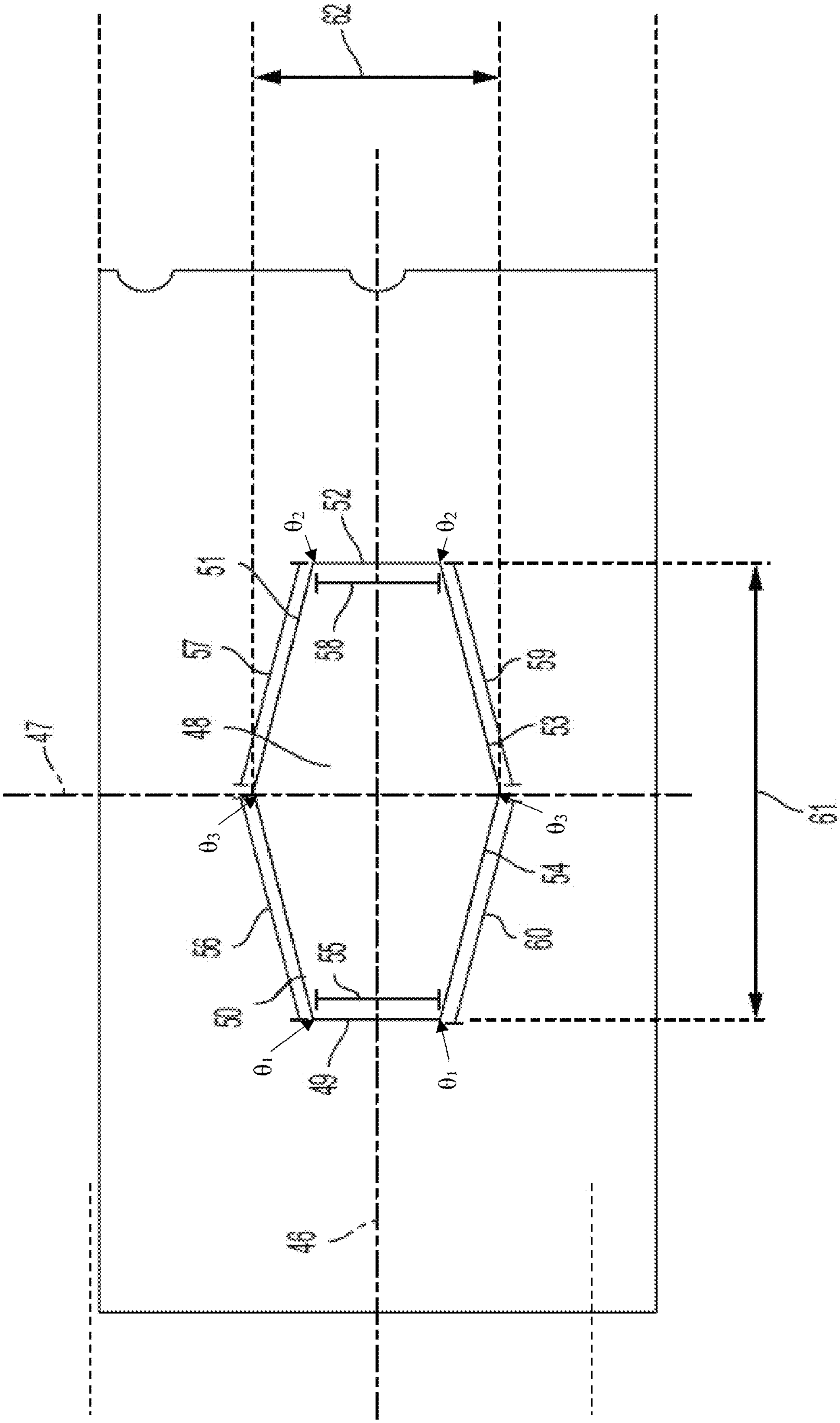
FIG. 9 is a detail view of the retaining plate aperture of the cutting blade of FIG. 4.

FIG. 9 is a detail view of the retaining plate aperture 48 of the cutting blade 36 of FIG. 4. The retaining plate aperture 48 is hexagon-shaped and has six sides 49, 50, 51, 52, 53, 54. The retaining plate aperture 48 is shaped as an (elongated) hexagonal parallelogon. Side 49 and side 52 are opposite each other and parallel both to each other and to the blade minor axis 47. Side 50 and side 53 are parallel to each other and make a first obtuse angle $\theta_1$ with side 49 and a second obtuse angle $\theta_2$ with side 52 respectively. Side 51 and side 54 are parallel to each other and side 51 makes the obtuse angle $\theta_2$ with side 52 and side 54 makes the obtuse angle $\theta_1$ with side 49. Side 50 makes a third obtuse angle $\theta_3$ with side 51 and side 54 makes the obtuse angle $\theta_3$ with side 53.

The sides 49, 50, 51, 52, 53, 54 each have a length 55, 56, 57, 58, 59, 60 respectively. Length 55 of side 49 is equal to length 58 of side 52; in some embodiments length 55 and length 58 are each 11.0 millimeters. Length 56 of side 50, length 57 of side 51, length 59 of side 53, and length 60 of side 54 are all equal to each other; in some embodiments, length 56, length 57, length 59, and length 60 are each 20.4 millimeters. In some embodiments, a length 61 of the retaining plate aperture 48 is 39.0 millimeters, and a width 62 of the retaining plate aperture 48 is 22.7 millimeters.

In other embodiments, the lengths 55, 56, 57, 58, 59, 60 and the length 61 and the width 62 are of other dimensions. For example, in one embodiment: length 55 and length 58 are each 12.0 millimeters; length 56, length 57, length 59, and length 60 are each 22.3 millimeters; the length 61 of the retaining plate aperture 48 is 42.5 millimeters; and the width 62 of the retaining plate aperture 48 is 24.8 millimeters. As a further example, in another embodiment: length 55 and length 58 are each 13.0 millimeters; length 56, length 57, length 59, and length 60 are each 24.2 millimeters; the length 61 of the retaining plate aperture 48 is 46.0 millimeters; and the width 62 of the retaining plate aperture 48 is 26.9 millimeters.

Figure 10:
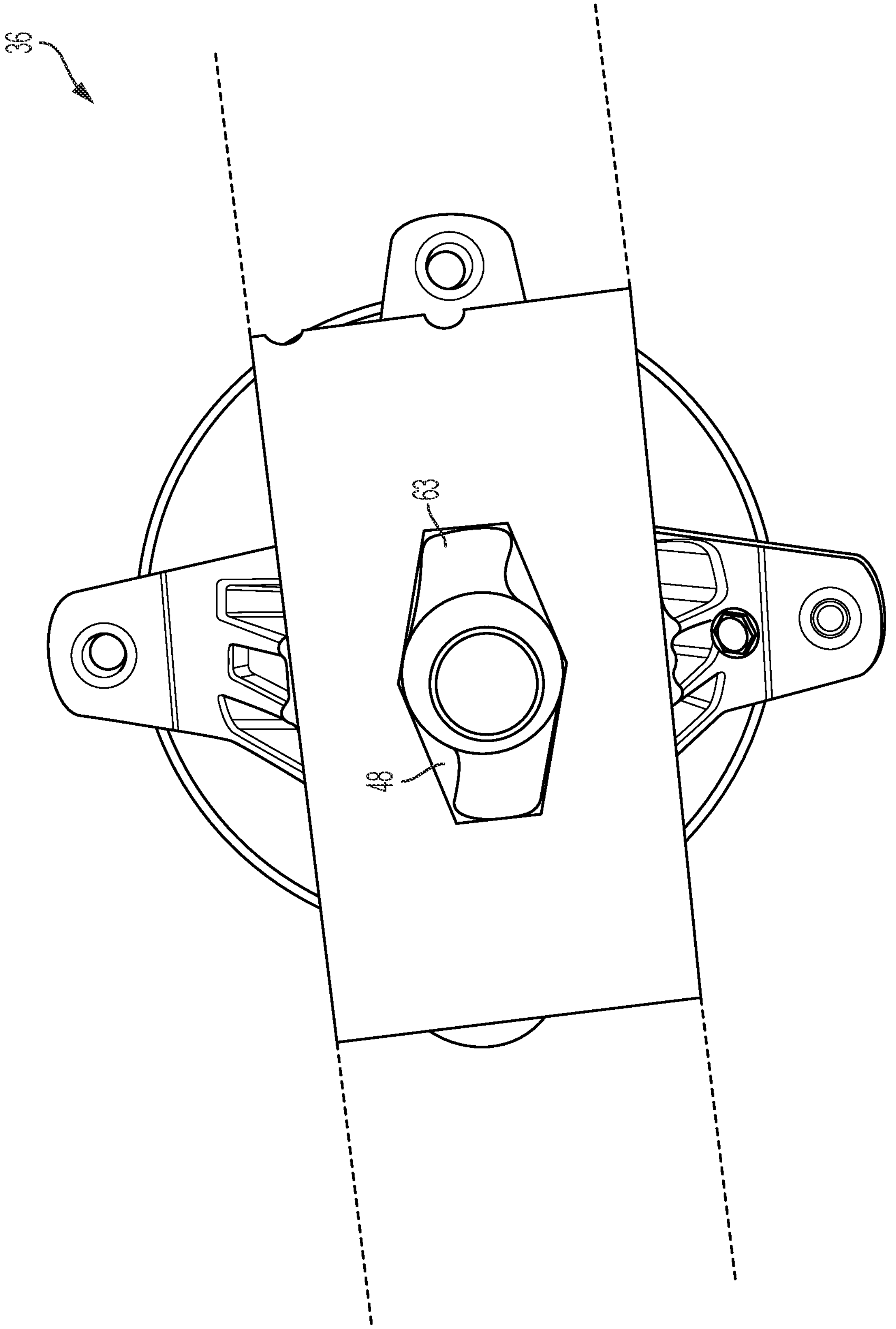
FIG. 10 is a detail view of the retaining plate aperture of the cutting blade of FIG. 4 mounted onto a retaining plate.

FIG. 10 is a detail view of the retaining plate aperture 48 of the cutting blade 36 of FIG. 4 mounted onto a retaining plate 63. In some embodiments, the retaining plate 63 may be an S-shaped retaining plate. For example, as shown in FIG. 10, the retaining plate 63 may be configured as an S-shaped retaining plate for use with the CRAFTSMAN Product as shown in FIGS. 3A-3B and as described above.

The retaining plate aperture 48 is slightly larger than the retaining plate 63. The retaining plate aperture 48 may be approximately the convex hull of the retaining plate 63. The retaining plate aperture 48 is configured such that the retaining plate 63 can pass through the retaining plate aperture 48. This relationship allows the cutting blade 36 to pass over the retaining plate 63 such that a portion of the rotatable spindle (not shown in FIG. 10 or in FIG. 2) passes through the cutting blade 36 at the retaining plate aperture 48.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

What is claimed is:

1. A mower blade comprising:

an elongate blade adapted for mounting onto a rotary mower for rotation about a center axis extending transverse to the elongate blade and separating the elongate blade into opposed elongate end portions;

wherein the elongate blade comprises a first pin aperture positioned a distance from the center axis;

a force finger aperture positioned a distance from the center axis and a distance away from the first pin aperture; and a retaining plate aperture centered on the center axis and having a length measured along a blade major axis and a width measured along a blade minor axis, wherein the retaining plate aperture is symmetric both about the blade major axis and about the blade minor axis, and the retaining plate aperture comprises an irregular polygonal shape having a first geometry, the first geometry comprising a first side, a second side, a third side, a fourth side, a fifth side, and a sixth side, wherein the first side and the fourth side are parallel to each other and are each of a first side-length, the second side and the fifth side are parallel to each other and are each of a second side-length, and the third side and the sixth side are parallel to each other and are each of the second side-length, wherein the first side-length is less than the second side-length, wherein the retaining plate aperture is configured to engage a retaining plate on the rotary mower, the retaining plate having a second geometry and the second geometry is different from the first geometry, wherein the second geometry is S-shaped, and wherein the length of the retaining plate aperture is greater than the width of the retaining plate aperture, the retaining plate aperture being sized to receive the retaining plate therethrough during mounting of the elongate blade onto the rotary mower, and wherein the elongate blade is configured to be reversibly mountable onto the retaining plate in at least two different rotational orientations.

2. The mower blade of claim 1, wherein the second side-length is 1.85 times as long as the first side-length.

3. The mower blade of claim 2, wherein the first side-length is 11 millimeters and the second side-length is 20.4 millimeters.

4. The mower blade of claim 1, wherein the length of the retaining plate aperture is 1.72 times as long as the width.

5. The mower blade of claim 4, wherein the length is 39 millimeters and the width is 22.7 millimeters.

6. A blade adapted for mounting onto a mower for rotation about a center axis extending transverse to the blade, the blade comprising:

a pair of pin apertures positioned a distance from the center axis and a distance from a blade major axis;

a pair of force finger apertures positioned a distance from the center axis and a distance from the pin apertures; and a central aperture located on the center axis and having a length measured along the blade major axis and a width measured along a blade minor axis, wherein the central aperture is symmetric both about the blade major axis and about the blade minor axis and the central aperture comprises an irregular polygonal shape having a first geometry, the first geometry comprising a first side, a second side, a third side, a fourth side, a fifth side, and a sixth side, wherein the first side and the fourth side are parallel to each other and are each of a first side-length, the second side and the fifth side are parallel to each other and are each of a second side-length, and the third side and the sixth side are parallel to each other and are each of the second side-length, and wherein the first side-length is less than the second side-length, and wherein the central aperture is configured to engage a retaining plate on the mower, the retaining plate having a second geometry and the second geometry is different from the first geometry, wherein the second geometry is S-shaped, and wherein the length of the central aperture is greater than the width of the central aperture, the central aperture being sized to receive the retaining plate therethrough during mounting of the blade onto the mower, and wherein the blade is configured to be reversibly mountable onto the retaining plate in at least two different rotational orientations.

7. The mower blade of claim 6, wherein the central aperture is of a convex shape.

8. The mower blade of claim 6, wherein the second side-length is 1.85 times as long as the first side-length.

9. The mower blade of claim 8, wherein the first side-length is 11 millimeters and the second side-length is 20.4 millimeters.

10. The mower blade of claim 6, wherein the length of the central aperture is 1.72 times as long as the width.

11. The mower blade of claim 10, wherein the length is 39 millimeters and the width is 22.7 millimeters.

12. A mower blade comprising:

a blade having a blade major axis, a blade minor axis, and a center axis extending transverse to the blade, the blade comprising a first aperture centered on the center axis, wherein the first aperture is symmetric both about the blade major axis and about the blade minor axis and the first aperture has a length measured along the blade major axis and a width measured along the blade minor axis, and wherein the first aperture is a convex, irregular hexagon having a first geometry, the first geometry comprising a first side, a second side, a third side, a fourth side, a fifth side, and a sixth side, wherein:

the first side and the fourth side are parallel to each other and are each of a first side-length, the second side and the fifth side are parallel to each other and are each of a second side-length, and the third side and the sixth side are parallel to each other and are each of the second side-length; and wherein the first side-length is less than the second side-length, wherein each of the second side and the sixth side forms a first obtuse interior angle with the first side, each of the third side and the fifth side forms a second obtuse interior angle with the fourth side, and the second side and the third side form a third obtuse interior angle, wherein the first obtuse interior angle and the second obtuse interior angle are equal, and the third obtuse interior angle is different from the first obtuse interior angle and the second obtuse interior angle, wherein the first aperture is configured to engage a retaining plate having a second geometry and the second geometry is different from the first geometry, wherein the second geometry is S-shaped, and wherein the length of the first aperture is greater than the width of the first aperture, the first aperture being sized to receive the retaining plate therethrough during mounting of the blade, and wherein the blade is configured to be reversibly mountable onto the retaining plate in at least two different rotational orientations.

13. The mower blade of claim 12, wherein the second side-length is 1.85 times as long as the first side-length.

14. The mower blade of claim 13, wherein the length of the first aperture is 1.72 times as long as the width.

15. The mower blade of claim 1, wherein each of the second side and the sixth side forms a first obtuse interior angle with the first side and each of the third side and the fifth side forms a second obtuse interior angle with the fourth side.

16. The mower blade of claim 15, wherein the first obtuse interior angle and the second obtuse interior angle are equal, and the second side and the third side form a third obtuse interior angle, wherein the third obtuse interior angle is different from the first obtuse interior angle and the second obtuse interior angle.

17. The mower blade of claim 1, wherein the elongate blade is configured to be reversibly mountable on the retaining plate in two rotational orientations offset by 180 degrees.

* * * * *